A. HAMMERSTROM.
SLED BRAKE.
APPLICATION FILED MAR. 11, 1918.

1,329,047.

Patented Jan. 27, 1920.

Witnesses

Inventor
A. Hammerstrom.

By Chandler & Chandler
Attorney

UNITED STATES PATENT OFFICE.

ARTHUR HAMMERSTROM, OF DEERFIELD, NEW HAMPSHIRE.

SLED-BRAKE.

1,329,047.          Specification of Letters Patent.     Patented Jan. 27, 1920.

Application filed March 11, 1918. Serial No. 221,759.

*To all whom it may concern:*

Be it known that I, ARTHUR HAMMERSTROM, a citizen of the United States, residing at Deerfield, in the county of Rockingham, State of New Hampshire, have invented certain new and useful Improvements in Sled-Brakes; and I do hereby declare the following to be a full, clear, and exact description of the invention, such as will enable others skilled in the art to which it appertains to make and use the same.

It is in general the object of the present invention to provide an exceedingly simple, durable and efficient braking device which may be readily attached to a sled of ordinary construction, and which may be controlled by an operator's foot at the front end of the sled for projecting brake members below the plane of the sled runners to engage and dig into snow and ice over which the sled travels and thus check the movement of the sled.

It is a more specific object to provide an arrangement wherein the various stresses exerted horizontally against the brake members by their engagement with the snow and ice are prevented from being transmitted directly to the means for procuring operative movement of the brake members, to thus relieve strain from said operating means, and its connections with the sled frame.

A further object resides in the provision of springs for urging the brake members to retracted or raised position, which are housed to prevent possible interference with their action, and wherein such housing serves as a guide means for the brake members, and comprises in itself portions of said members.

With the above and other objects and advantages in view, the invention resides more particularly in the novel combination, formation and arrangement of parts hereinafter described and particularly pointed out in the appended claim.

Figure 1:
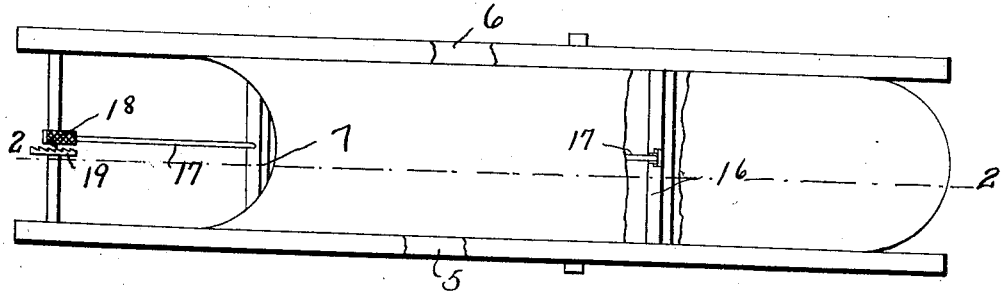
Figure 1 is a plan view of a sled having the improved brake means associated therewith.
Figure 2:
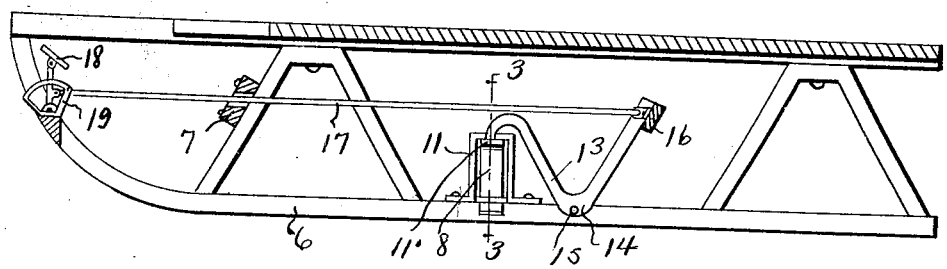
Fig. 2 is a longitudinal sectional view through the sled on the line 2—2 of Fig. 1.
Figure 3:
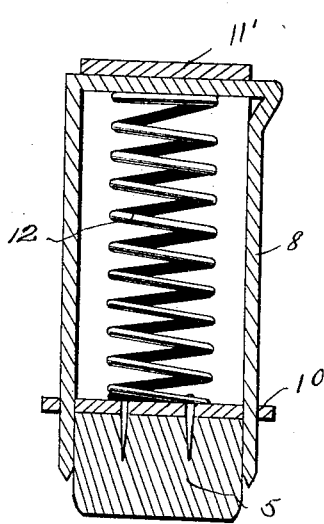
Fig. 3 is a detail transverse sectional view on the line 3—3 of Fig. 2.
Figure 4:
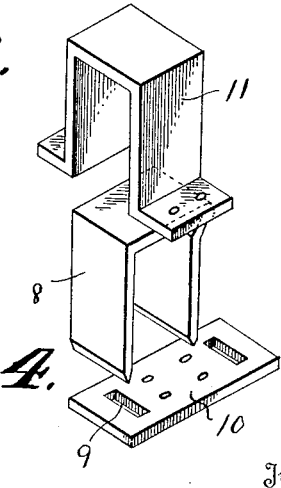
Fig. 4 is a perspective, partially disassembled view of one of the spring and brake member mountings.

Referring now more particularly to the accompanying drawings, 5 and 6 designate the runners of a sled, and 7 designates the usual cross bar at the front end of the sled frame.

The improved brake mechanism comprises a pair of brake members 8, each formed by a single bar of metal bent in inverted U-shape to straddle one of the runners and having its legs of considerably greater length than the height of the runner whereby the free ends of the legs, which are preferably sharpened, may project a considerable distance below the runner to engage and dig into ice and snow over which the runner travels. The legs of each brake member are slidably passed through slots 9 in the sides of a plate 10 secured on the top edge of the runner and extending therebeyond at each side thereof. Also secured to the top edge of each runner are the lower ends of the legs of housing and guide members 11 each formed of a bar bent in inverted U-shape to straddle the corresponding brake member, whereby the legs of said members 8 and 11 form housings for springs 12 disposed between the plates 10 and the bight portions of the brake members and normally urging the brake members to retracted raised position free of the sledding surface. The legs of the members 11 also form guides for the upper portions of the brake members and the bights of said members 11 form stops limiting upward movement of the brake members.

As a necessary essential to any U-shaped member, the U-shaped member in the present instance includes not only the legs 8 and 11 but also a connecting bight portion.

For depressing the brake members an angular lever 13 is provided, having its angle portion 14 pivotally supported centrally on the pivot bolt 15 which is disposed transversely of the sled and supported at its ends in the runners. The forward end of the lever is curved downwardly for engagement with the central portion of the bar 11' which extends transversely of the sled and has its ends disposed between the bight portions of the members 8 and 11, to depress said bar and move the brake members downwardly through the slots 9 and into biting engagement with the ice or snow and the guide members 11, to depress said brake members. The rear end of the lever 13 carries a cross bar 16, from which a connection 17 extends forwardly of the sled, through the front bar 7 and is attached to a foot lever 18 pivoted on the sled frame and preferably controlled in position by a ratchet segment 19.

Thus, an operator may rock the lever 18 forwardly with his foot to project the brake members below the sled runners a variable distance determined by the degree of braking action desired and by the condition of the sledding surface, it being understood that on ice the brake members would need to project but a slight distance, while in snow they would project a considerable distance to dig thereinto and effect the braking action.

It is observed that by the vertical slide mounting afforded the brake members, their operating levers and their pivotal connections are relieved from sudden and severe stresses incident to engagement of the brake members with surface projections.

What is claimed is:

In a sled brake, the combination with the runners of the sled, of a plate disposed transversely of the upper face of each runner and projecting from the sides thereof, said projecting ends of the plate having slots extending longitudinally of the runner, an inverted yoke having its arms disposed for vertical slidable movement in said slots and having the ends thereof oppositely beveled, a second yoke straddling the first yoke and having its ends secured to the runner, a bar extending transversely of the sled and having its ends engaging on the bight portions of the first yokes, springs between the plates and the bight portions of the first yoke for normally urging the said yokes upwardly, and means for engagement with the bar to depress the same and move the first yokes downwardly through the said slots.

In testimony whereof I affix my signature in the presence of two witnesses.

ARTHUR HAMMERSTROM.

Witnesses:
  CORA E. WILSON,
  GRACE E. WILSON.